United States Patent [19]
Yuen

[11] Patent Number: 6,137,950
[45] Date of Patent: Oct. 24, 2000

[54] BAR CODE MATRIX TELEVISION CALENDAR

[75] Inventor: Henry C. Yuen, Redondo Beach, Calif.

[73] Assignee: Gemstar Development Corporation, Pasadena, Calif.

[21] Appl. No.: 08/279,628

[22] Filed: Jul. 25, 1994

Related U.S. Application Data

[63] Continuation of application No. 07/780,639, Oct. 23, 1991, abandoned.

[51] Int. Cl.⁷ .................................................. H04N 5/76
[52] U.S. Cl. ............................................................. 386/83
[58] Field of Search ...................... 358/335, 342; 360/33.1, 69; 348/906, 731, 732; 455/185.1, 186.1; 386/83, 46

[56] References Cited

U.S. PATENT DOCUMENTS

| | | | |
|---|---|---|---|
| 4,329,684 | 5/1982 | Monteath et al. | 340/707 |
| 4,475,153 | 10/1984 | Kihara et al. | 358/335 |
| 4,841,132 | 6/1989 | Kajitani et al. | 358/335 |
| 5,047,867 | 9/1991 | Strubbe et al. | 358/335 |
| 5,056,070 | 10/1991 | Shibuya et al. | 358/335 |
| 5,335,079 | 8/1994 | Yuen et al. | 358/335 |

FOREIGN PATENT DOCUMENTS

| | | |
|---|---|---|
| 0181577 | 7/1988 | Japan . |
| 2034995 | 6/1980 | United Kingdom . |

*Primary Examiner*—Huy Nguyen
*Attorney, Agent, or Firm*—Christie, Parker & Hale, LLP

[57] ABSTRACT

A television calendar arranged in a channel/time of day matrix for combined visual selection of programs for direct viewing and for use in automatic recording of programs for future viewing having a vertical column of bar codes that are encoded to represent and arranged adjacent to a vertical column of channel indicators and having a horizontal row of bar codes that are encoded to represent and arranged adjacent to a horizontal row of time of day indicators for the start of a television program. The arrangement of channels vertically and time of day horizontally can be reversed. A template overlay of just the vertical and horizontal bar codes can be used with a normal television program arranged in a matrix with a separate listing of day of month bar codes. Alternatively, the day of month bar code can be printed on every page of the television program arranged in a matrix and used with the template overlay of the vertical and horizontal bar codes.

2 Claims, 6 Drawing Sheets

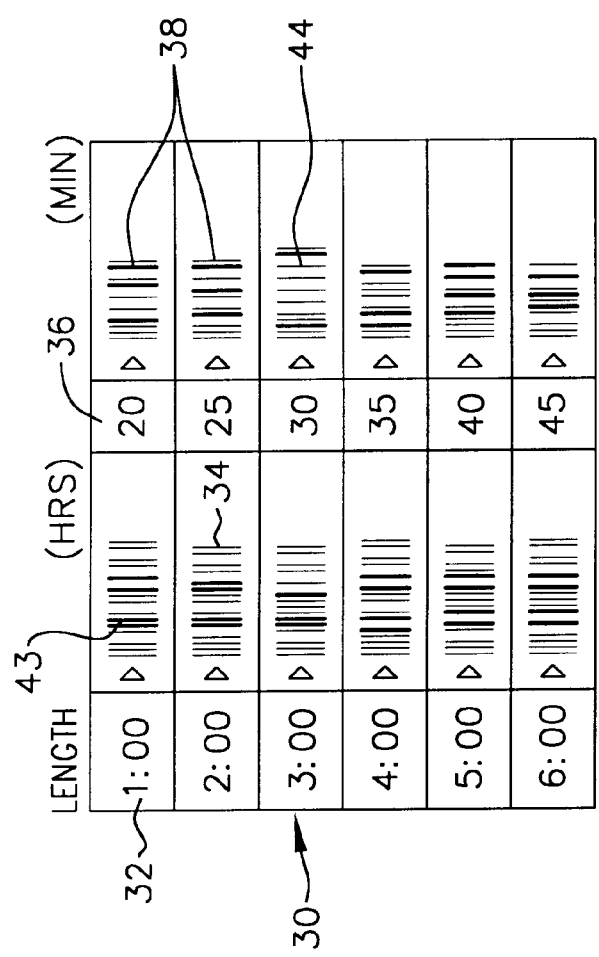

*FIG. 3*
EVERY DAY
47
*FIG. 4*
CLEAR
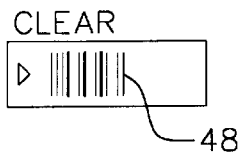
48
*FIG. 5*
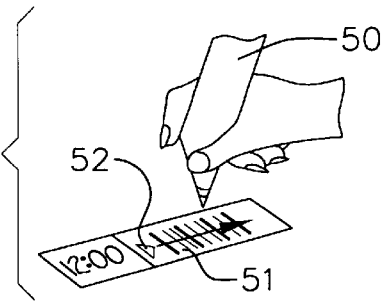
*FIG. 6a*
*FIG. 6b*
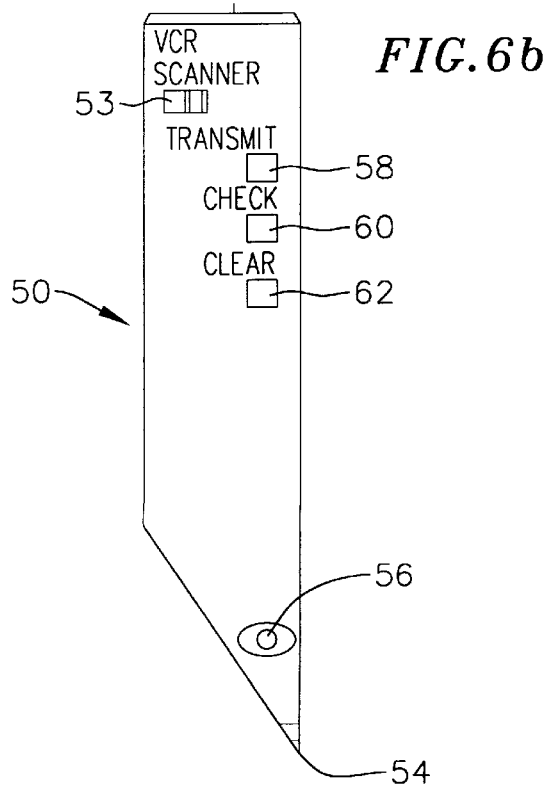
*FIG. 7* — 74
```
PROG. 1
DATE 12 MON
START 10:00 PM
STOP  11:00 PM
CH.   2
TO ERASE PUSH CLEAR
```
*FIG. 8* — 76
```
1 12 10:00P 11:00P 02
2 -- --    --     --
3 TU  8:30A  9:00A 08
4 DAY 8:00P  9:00P 12
NEXT PROG....CHECK KEY
```

FIG. 11

| DATE | | | | |
|---|---|---|---|---|
| 1 | ▷ ‖‖‖‖‖ | 16 | ▷ ‖‖‖‖ |
| 2 | ▷ ‖‖‖‖ | 17 | ▷ ‖‖‖‖‖ |
| 3 | ▷ ‖‖‖‖ | 18 | ▷ ‖‖‖‖ |
| 4 | ▷ ‖‖‖‖ | 19 | ▷ ‖‖‖ |
| 5 | ▷ ‖‖‖‖ | 20 | ▷ ‖‖‖‖ |
| 6 | ▷ ‖‖‖‖ | 21 | ▷ ‖‖‖‖ |
| 7 | ▷ ‖‖‖‖ | 22 | ▷ ‖‖‖‖ |
| 8 | ▷ ‖‖‖‖ | 23 | ▷ ‖‖‖‖ |
| 9 | ▷ ‖‖‖‖ | 24 | ▷ ‖‖‖‖ |
| 10 | ▷ ‖‖‖‖ | 25 | ▷ ‖‖‖‖ |
| 11 | ▷ ‖‖‖‖ | 26 | ▷ ‖‖‖‖ |
| 12 | ▷ ‖‖‖‖ | 27 | ▷ ‖‖‖‖ |
| 13 | ▷ ‖‖‖‖ | 28 | ▷ ‖‖‖‖ |
| 14 | ▷ ‖‖‖‖ | 29 | ▷ ‖‖‖‖ |
| 15 | ▷ ‖‖‖‖ | 30 | ▷ ‖‖‖‖ |
| | | 31 | ▷ ‖‖‖‖ |

100 — (pointing to date rows 1, 2, 3)
102 — (pointing to barcodes)

FIG. 12

SATURDAY JULY 20, 1991

| | 7:30 | 8:00–18 — 8:30 | 9:00 | 9:30 | 10:00 | 10:30 | 11:00 |
|---|---|---|---|---|---|---|---|
| 4–16 | ROGGIN'S HEROES | DOWN HOME | GOLDEN GIRLS | EMPTY NEST—20 | DEAR JOHN—20 | SATURDAY NIGHT LIVE—20 | |
| 5 | MOVIE ✓ "THE WILD LIFE"(1984) | MOVIE "THE PETRIFIED FOREST" (COLORIZED)(1936) | | NEWS–McCORMICK, PEREZ—20 | | CHEERS | |
| 13 | MOVIE "KING KONG" ✓✓ (1976) JEFF BRIDGES, JESSICA LANGE, CHARLES GRODIN.(PG) | | | | NEWS–ATTEBERY DASILVA | (CC)ARSENIO HALL–"GUESTS: STEVE WINWOOD; DEREK; CHARLES KORSMO."(REPEAT) | |
| BRAVO | D.LANDER | SOUTH BANK SHOW | MOVIE ✓✓ "FRIDA"(1985) OFELIA MEDINA, JUAN JOSE GURROLA | | | MOVIE ✓✓ "THE WOMAN IN QUESTION"(1950) | |
| CMAX | MOVIE ✓✓ "FERRIS BUELLER'S DAY OFF"(1986) | | MOVIE ✓✓ —39 "BLUE THUNDER"(1938)ROY SCHEIDER, MALCOM McDOWELL.(R) | | | MOVIE ✓✓✓ "ENRAPTURE" (1989) KEVIN THOMSEN, ONA SIMMS(R) | |
| HBO | MOVIE ✓✓ "DAYS OF THUNDER"(1990)(PG-13) | | MOVIE "DOUBLECROSSED" (S)(1991) DENNIS HOPPER, ROBERT CARRADINE | | | TALES / CRYPT | BEST OF ROBERT TOWNSEND |

BAR CODE MATRIX TELEVISION CALENDAR

CROSS-REFERENCE TO RELATED APPLICATION

This is a continuation of application Ser. No. 07/780,639, filed Oct. 23, 1991 now abandoned.

BACKGROUND OF THE INVENTION

1. Field of the Invention

This invention relates to bar code readers used to timer preprogram a videocassette recorder (VCR) to record a particular television program.

2. Prior Art

VCRs with a bar code programming (BCP) feature were introduced several years ago. The ideal situation is to print a bar code, representing the Channel, Date, Time and Length information (CDTL information), next to each television program. Anyone wishing to tape a given television program would then draw the bar-code reader across the corresponding bar code and the VCR would be automatically set to tape the television program. However, no regularly distributed publications (television guides, cable guides or newspapers) print the bar code next to each program, or any significant fraction of the programs listed. The reason is that a bar code containing the CDTL information could be 2 to 3 inches long with a height of ⅓ to ½ inch. In order to print a bar code next to each television program, a large amount of space would have to be allocated. With the large number of television programs and the high cost of publication, this proposition is economically unfeasible.

Instead, BCP sellers distribute a sheet containing separate groups of bar codes for the channel, date, time and length, and require the user to first look up from a television program listing the CDTL information, then enter it by drawing the bar-code reader across appropriate segments in the bar-code sheet. This process is tedious because it involves both the television guide and the bar-code sheet, and requires a significant amount of eye-hand translation and coordination.

Some sellers of BCP distribute a limited quantity of pamphlets with bar codes for a limited selection of shows. Using these sheets, the user can achieve the original objective of entering the show for taping with one step. Unfortunately, the coverage and quantity of these pamphlets are not sufficient to make BCP popular.

One particular VCR with bar code programming is the Panasonic PV-4020, manufactured by Matsushita Corp., Toyko, Japan, which allows 4 separate unattended recordings over a one month time period to be programmed with a bar code scanner.

To use the Panasonic PV-4020 bar scanner, a mode selector switch is set to the "SCANNER" position and the clock on the VCR is set to the correct time. Then the program to be preprogrammed is looked up by the user in a regular television program listing. Then the scanner power button is pressed "ON", and the user traces from a separate bar code programming sheet, the date, the start time, the stop time and the channel. The bar code programming sheet has bar codes for each possible day of a month (1–31), each possible start time 12 AM to 11 PM with minutes in 5 minute intervals, each possible stop time in the same format, and bar codes for each possible channel (00 to 99). When all information is entered correctly, multiple beeps are heard from the scanner. Then the user can point the scanner at the VCR and press the transmit button to send the scanned date, start time, stop time and channel to the VCR. The VCR will give a series of confirmation beeps. Then a 15 second display of the program contents will appear on the TV screen. The program transmitted can be cleared by pressing the Clear button while it is displayed.

If the program was not entered correctly, a message to that effect appears on the TV screen for 15 seconds when the Transmit button is pressed. The user then scans a "CLEAR" bar code on the programming sheet and then re-enters the program by tracing the date, start time, stop time, and channel bar codes again. When the codes are properly entered the user turns the scanner Power button "OFF", which sets the VCR for timer programming.

The user can also record at the same time every day by scanning the EVERY DAY bar code, or the user can record at the same time on the same day of each week by scanning the EVERY WEEK bar code.

If the user wishes to check the programming then the user can press the Check button on the Bar Code Scanner. The entire program will be displayed on the TV screen and the first program will flash. If the user continues to press the check button, each program number will flash in turn. If the Check button is pressed when the 4th program number is flashing, then the on screen display will return to normal TV channel reception. In the check mode, when a program is flashing, it can be cancelled by pressing the Clear button on the Bar Code Scanner.

As is evident from the prior description the prior art for bar code programming is cumbersome, because it requires the user to manually select the proper bar codes from a separate bar code sheet for the selected program and requires a significant amount of eye-hand translation and coordination.

SUMMARY OF THE INVENTION

This invention is a novel means of formatting the television guides so that bar code information can be conveniently displayed for the users of bar code programming (BCP) without occupying significant space and therefore rendering the widespread printing of bar-code information economically feasible.

The contemplated format allows CDTL information in the form of bar codes to be integrated with a television guide so that it can be intuitively and easily read by the BCP user and to permit the bar-coded information to be directly and intuitively related to every show shown in a grid format of the television guide so that the user does not have to go to a separate bar-code sheet to retrieve this information.

The bar codes and programs are arranged in a row-column layout with channel bar codes arranged along the column headings and time of day bar codes arranged along the row headings or visa versa. A bar code for the day of the month is located anywhere on the sheet. Also a program length table of bar codes can be provided on the sheet or the start time of day of the next program on the same channel can be scanned to derive the time of day to terminate recording. The length information can be absolute or additive, such that the user scans a bar code representing the absolute time, such as 3 hours or for additive time scans a bar code representing 1 hour three times, resulting in a total of three hours.

In certain situations, the print quality of the bar codes may be too demanding for normal newspapers. It may be more efficient to use a single template which can employ durable material and high quality printing for each television magazine, which when placed over the television program grid can provide the CDTL information. The date information can be printed on every page in the television guide near the television program grid with a large enough print, because it is printed only once for each day. The television program grid with the date on every page would be used in conjunction with a template with the channel bar codes and the time of day bar codes. Alternately, the date could be scanned from a separate list of "days of the week" or "days of the month".

BRIEF DESCRIPTION OF THE DRAWINGS

A better understanding of the invention and its advantages will be apparent from the detailed description taken in conjunction with the accompanying drawings in which:

FIG. 1b is a bar code table to allow a user to specify program length.

FIG. 2 is a bar code table to allow a user to specify the recording of a program every week on the day selected.

FIG. 3 is a bar code to allow a user to specify the recording of a program every day.

FIG. 4 is a bar code to allow a user to clear a program that has been preprogrammed for recording.

FIG. 5 illustrates the scanning of a bar code with a bar code scanner.

FIG. 6 illustrates the transmission of a program from a bar code scanner (FIG. 6b) to a VCR (FIG. 6a).

FIG. 7 illustrates an on screen display for confirming the transmitted program.

FIG. 8 illustrates an on screen display for checking and/or clearing preprogrammed programs.

FIG. 11 illustrates a bar code table to allow a user to specify the date for recording.

FIG. 12 is a television program calendar with the date bar code printed on the television calendar, which would be used along with a template overlay for bar code programming with time bar codes on the horizontal axis and the channel bar codes on the vertical axis, as shown in FIG. 9.

DESCRIPTION OF THE PREFERRED EMBODIMENTS

Figure 1A:
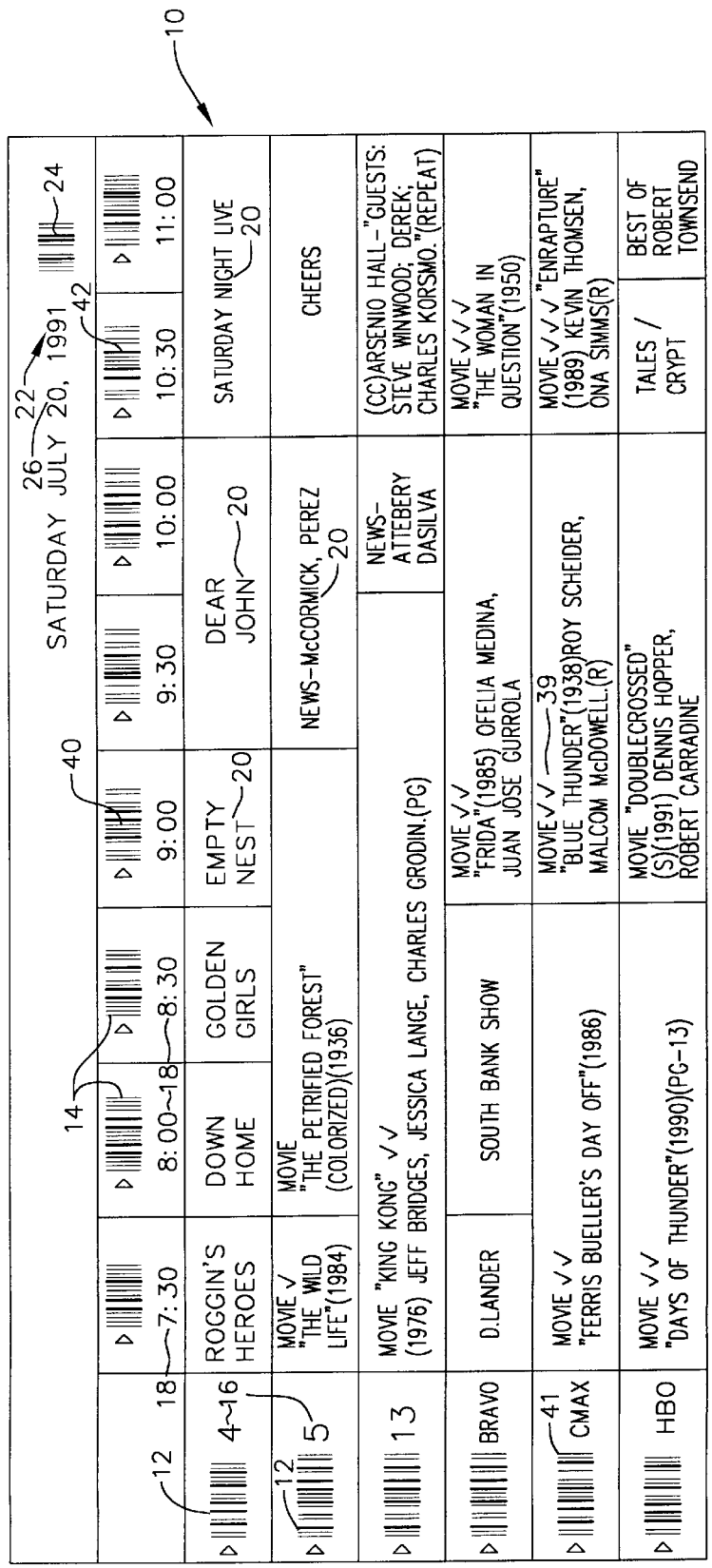
FIG. 1a is a television program calendar of the present invention showing the placement of bar codes along a channel axis and a time axis to allow a user to preprogram a VCR to record a program.

Referring now to the drawings, and more particularly, to FIG. 1, there is shown a matrix bar code calendar 10 of the present invention. The leftmost column is a vertical column of channel bar codes 12 and the upper row is a horizontal row of time of day bar codes 14, which correspond to and represent the vertical listing of channel indicators 16 and horizontal listing of time of day indicators 18, respectively. The program descriptors 20 are arranged within the matrix bar code calendar 10, so that they are properly aligned with the channel indicators 16 and the program start times indicated by the time of day indicators 18. With each matrix bar code calendar 10 is a date indicator 22, a component of which is the day of the month indicator 26. For FIG. 1, the date indicator 22 is Saturday Jul. 20, 1991. The day of the month indicator 26 is the 20th day of July. Along side the date indicator 22 is a day of month bar code 24, which represents the day of the month indicator 26.

The matrix bar code calendar 10 could also have a length of program bar code table 30, which consists of a set of length of program indicators 32 calibrated in hours and corresponding set of length of program bar codes 34. There can also be a set of length of program indicators 36 calibrated in minutes and corresponding length of program bar codes 38.

To scan in a program, using, for example, the Panasonic PV-4020, the user would identify the program to record by looking at matrix bar code calendar 10. Suppose the user has selected Blue Thunder, starting at 9:00 and ending at 10:30 on channel CMAX. Then the user would use a scanner 50, such as that shown in FIG. 6a, in the manner shown in FIG. 5 to scan particular bar codes 51. The scan start point is indicated in FIG. 5 as scan start point 52. While scanning the bar codes the user would press the scanner on button 56 on scanner 50. This activates bar code reading lamp 54.

To preprogram a VCR for recording the movie Blue Thunder 39, shown in FIG. 1, the user would first scan the day of month bar code 24 and then the start time of day bar code 40. The next bar code to be scanned depends on how the system operates. If the stop time of day is desired then stop time of day bar code 42 could be scanned, which is the time of day for the next program on the same channel. For some systems, such as the Panasonic PV-4020, the length of the program is the desired input, rather than the stop time of day. The length of the program could be supplied by scanning length of program in hours bar code 43 followed by the length of program in minutes bar code 44, as shown in FIG. 1b. The last item to be scanned would be the channel, which would be obtained by scanning the channel bar code 41, which represents CMAX.

Thus, the user never has to leave the matrix bar code calendar 10, because all the information that is needed is conveniently arranged for the user. Once the proper bar codes are all scanned, the user points the scanner 50 at the video cassette recorder (VCR) 70, as shown in FIGS. 6a and 6b, and presses the transmit button 58. If the program has been entered properly, then the television connected to the VCR will show an on screen display for confirming the VCR programming, such as that shown in FIG. 7 showing transmitted program information 74. The television will show transmitted program information 74 for a short while and then return to the normal television channel. If the program hasn't been properly entered, then a warning is displayed on the television and the user can clear the bar scanner by scanning clear bar code 48, shown in FIG. 4, and then rescanning the program bar codes.

If the user wishes to check the programs that have been preprogrammed for recording, then the user presses the check button 60 on scanner 50, which will cause a television connected to the VCR to show the on screen display for checking and/or clearing preprogrammed programs 76, as shown in FIG. 8. The first program will flash and if the user wishes to cancel the program, then the user does so by pressing clear button 62. The user can scroll between programs by continuing to press check button 60. After the last program, the last press of check button 60 will return the television to the normal channel.

It is possible for the user to specify that a program will be recorded every week at the same time, which is useful for weekly serials, by scanning a day of week bar code 46 representing and corresponding to a day of week indicator 45, as shown in FIG. 2. It is also possible for the user to specify that a program will be recorded every day at the same time, which is useful for daily soaps, by scanning an everyday bar code 47, as shown in FIG. 3.

Figure 9:
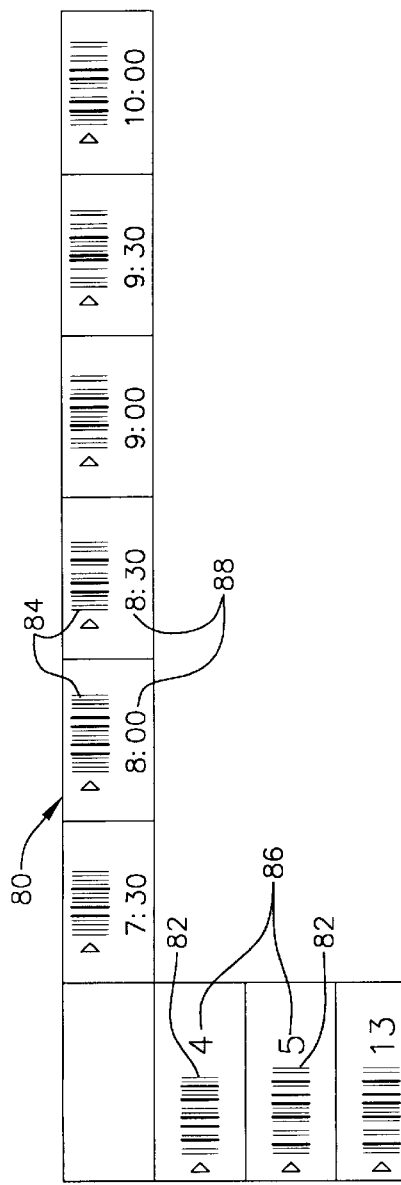
FIG. 9 illustrates a template overlay for bar code programming with the time on the horizontal axis and the channels on the vertical axis.

As indicated before, the print quality of the bar codes may be too demanding for normal newspapers. It may be more efficient to use a matrix bar code calendar overlay 80, such as shown in FIG. 9, which can employ durable material and high quality printing and which when placed over the television calendar grid can provide the CDTL information. On overlay 80, vertical channel bar codes 82 are placed in a column corresponding to the channel indicators 86, and horizontal time of day bar codes 84 are placed in a row corresponding to the time of day indicators 88. The overlay of FIG. 9 is shown with the channels 86 and time of days 88 printed on the overlay; however, they are not necessary as long as the user understands how to align the overlay and the television calendar, which would be arranged the same as FIG. 1, but without the vertical column of channel bar codes 12 and the horizontal row of time of day bar codes 14. If the day of month bar code 24 is also not printed, then a day of month table, as shown in FIG. 11, with day of month indicators 100 and corresponding day of month bar codes 102 would be provided to allow the day of the month to be scanned.

Figure 10:
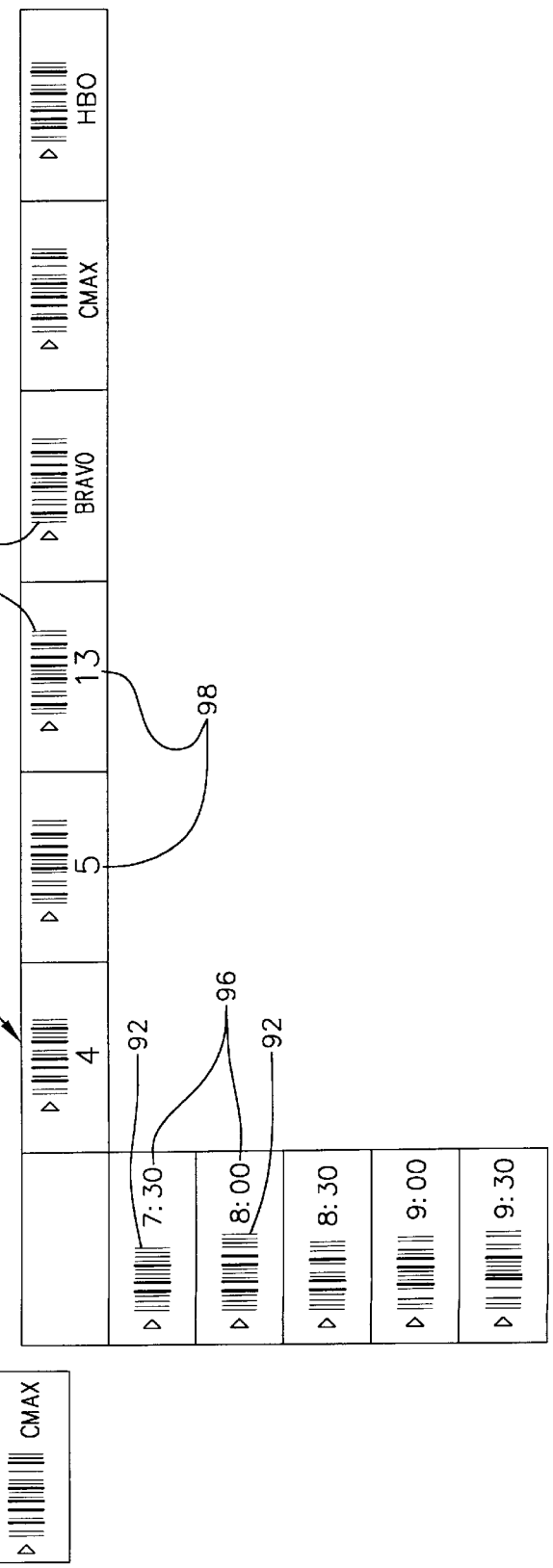
FIG. 10 illustrates a template overlay for bar code programming with the channels on the horizontal axis and the time on the vertical axis.

It is possible that the overlay and the television calendar could be arranged as shown in FIG. 10, which has vertical time of day bar codes 92 and horizontal channel bar codes 94 corresponding to and representing the time of day indicators 96 and channel indicators 98, respectively. This arrangement could also be applied to matrix bar code calendar 10. Note that by convention the codes are shown in FIG. 1a across the top of the calendar and the vertical codes are on the left side of the television calendar; however, they could just as easily have been across the bottom and at the right side of the television calendar.

The day of month bar code 24 could be printed directly on the television calendar for each day and on every page, as shown in FIG. 12, because it is printed only once for each day and therefore can have large enough print. This avoids possible problems with printing quality. This calendar would be used along with a template, such as that shown in FIG. 9, which would provide the vertical channel bar codes 82 and the horizontal time of day bar codes 84. Another advantage of this type of calendar is that it would remind the user that bar code programming is available by the prominent display of the day of month bar code. The user would scan the bar codes for the day of month, the channel, the start time and the stop time, which would be the same as the start time for the succeeding program on the same channel. Alternately, the length of program could be entered by scanning the appropriate bar codes FIG. 1b, the bar code table for length of the program.

It is thought that the present invention and many of its attendant advantages will be understood from the foregoing description and it will be apparent that various changes may be made in the form, construction and arrangement of the parts thereof and in the methods used without departing from the spirit and scope of the invention or sacrificing all of its material advantages, the forms hereinbefore described being merely a preferred or exemplary embodiments thereof.

I claim:

1. A method of controlling a VCR with a television calendar having a rectangular grid of cells arranged in horizontal rows and vertical columns, a television program descriptor located in each cell, a first set of bar codes arranged along one side of the grid, a second set of bar codes arranged along another side of the grid perpendicular to the first set so each cell lies at the intersection of a bar code in the one set that represents time and a bar code in the other set that represents channel, the method comprising the steps of:

selecting a descriptor of a television program to be recorded on the VCR;

reading the bar code in one of the sets that corresponds to the cell in which the selected descriptor is located to identify the time of the selected descriptor;

reading the bar code in the other set that corresponds to the cell in which the selected descriptor is located to identify the channel of the selected descriptor;

converting the read bar codes to time and channel signals; and applying the time and channel signals to the VCR to record the program represented by the selected descriptor.

2. The method of controlling a VCR of claim 1 wherein the step of reading the bar code in said one of the sets that corresponds to the cell in which the selected descriptor is located to identify the time of the selected descriptor further comprises the step of reading the bar code in said one of the sets that corresponds to the cell in which an adjacent descriptor is located to identify the time that the selected decriptor ends.

\* \* \* \* \*